United States Patent [19]

Kawamata et al.

[11] 3,956,151

[45] May 11, 1976

[54] METHOD FOR PRODUCING A FERROMAGNETIC CHROMIUM OXIDE

[75] Inventors: Tadashi Kawamata, Katana; Eiichi Hirota, Hirakata; Yukio Terada, Katano, all of Japan

[73] Assignee: Matsushita Electric Industrial Co., Ltd., Japan

[22] Filed: July 22, 1974

[21] Appl. No.: 490,703

[30] Foreign Application Priority Data

July 24, 1973 Japan................................ 48-83408

[52] U.S. Cl.............................. 252/62.51; 423/607
[51] Int. Cl.².................. C01G 37/02; C04B 35/12
[58] Field of Search................... 252/62.51; 423/607

[56] References Cited
UNITED STATES PATENTS

| | | |
|---|---|---|
| 2,923,685 | 2/1960 | Swoboda........................ 252/62.51 |
| 3,243,260 | 3/1966 | Kubota et al...................... 423/607 |
| 3,278,263 | 10/1966 | Cox................................... 423/607 |
| 3,486,851 | 12/1969 | Hicks................................ 423/607 |
| 3,493,338 | 2/1970 | Hicks et al......................... 423/607 |

*Primary Examiner*—Jack Cooper
*Attorney, Agent, or Firm*—Wenderoth, Lind & Ponack

[57] ABSTRACT

A method for producing, under a low pressure such as an ambient atmospheric pressure, a ferromagnetic chromium oxide having a sufficiently high saturation magnetization and, if necessary, sufficiently high coercive force as well. The main feature of this method is to use $H_2O_2$ in conjunction with $CrO_3$ and, if necessary, Te, Sb or an alkali element as well and to heat them.

18 Claims, No Drawings

METHOD FOR PRODUCING A FERROMAGNETIC CHROMIUM OXIDE

This invention relates to a method for producing a ferromagnetic chromium oxide, and more particularly to a method for producing a ferromagnetic chromium oxide suitable for use in a magnetic core or recording media.

Since S.M. Ariya et al. succeeded in obtaining pure chromium dioxide by the thermal decomposition of chromium trioxide under high oxygen pressure, many studies have been carried out to develop a suitable power for magnetic recording. See, for example U.S. Pat. Nos. 2,885,365, 2,923,683, 2,923,684, 2,956,955 and 3,243,260. U.S. Pat. No. 2,956,955 shows that pure chromium dioxide is obtained by the thermal decomposition of chromium trioxide at a temperature of 400°C to 525°C under a pressure of 500 atmospheres or higher. Pure chromium dioxide thus obtained is not ferrimagnetic oxide as seen in other magnetic oxides but it is a ferromagnetic oxide with a high saturation magnetization of about 100 e.m.u/g at room temperature. It has comparatively low Curie temperature of 116°C, a rutile type crystalline structure with $a_o = 4.42A$ and $Co = 2.91 A$ and particle size of less than $10\mu$ in length with axial ratio (width/length) of ½ to 1/20. Such pure chromium dioxide material is neither hard nor soft and is not suitable for use in high-density recording.

Recent industry in high-density recording requires a magnetic oxide powder having a high coercive force and high saturation magnetization. For this purpose, various magnetic powders have been developed, for example, a magnetic iron oxide powder with cobalt therein and ferromagnetic chromium oxide powders modified with tellurium or antimony. These ferromagnetic chromium oxide powders are in an acicular shape and have a high coercive force. The conventional methods for producing ferromagnetic pure or modified chromium oxide, however, require high pressure in heat-decomposing chromium trioxide. The preparation of a pure or modified ferromagnetic chromium oxide powder under a pressure as low as an atmosphere (1 kg/cm$^2$) has been very difficult. It is desirable to produce ferromagnetic chromium oxides by using a reaction pressure as low as possible. Some studies have been carried out to produce ferromagnetic chromium oxides under atmospheric pressure. For example, U.S. Pat. No. 2,923,683 describes that when a mixture of chromium trioxide and antimony trioxide is heated at a temperature of 300°C to 340°C in a stream of superheated steam, the product (Sb modified chromium oxide), however, has low saturation magnetization of 66.5 e.m.u./g.

An object of this invention is to provide a method for producing a ferromagnetic chromium oxide having a high saturation magnetization which method does not require a high pressure and can be carried out under an atmospheric pressure.

Another object of this invention is to provide a method for producing, in an atmospheric pressure, a ferromagnetic chromium oxide having a high coercive force along with high saturation magnetization.

A further object of this invention is to provide a method for producing, in an atmospheric pressure, a ferromagnetic chromium oxide having a higher coercive force and higher saturation magnetization.

According to this invention, a ferromagnetic chromium oxide having a high saturationmagnetization is produced under a low pressure such as an atmospheric pressure by mixing a hydrogen peroxide solution with chromium trioxide. For example, a saturation magnetization of more than 90 e.m.u./g is obtained.

According to this invention, a ferromagnetic chromium oxide having a high coercive force along with a high saturation magnetization is produced under an atmospheric pressure by mixing a hydrogen peroxide solution and also tellurium or antimony with chromium trioxide. For example, a saturation magnetization and a coercive force of 75–95 e.m.u/g and 140–220 Oe, respectively, are obtained.

According to this invention, a ferromagnetic chromium oxide having a higher coercive force along with a higher saturation magnetization is produced under an atmospheric pressure by mixing a hydrogen peroxide solution, tellurium (or antimony) and an alkaline compound with chromium trioxide. For example, a saturation magnetization and a coercive force of 80–95 e.m..u./g and 180–350 Oe, respectively, are obtained.

According to this invention, in the case of using tellurium (or antimony) or tellurium (or antimony) along with an alkaline compound, the coercive force of the ferromagnetic chromium oxide is further increased by using rapid heating and rapid cooling. For example, an increment of 50–100 Oe is obtained thereby.

Details of this invention will be apparent from the following descriptions.

A method of this invention comprising: preparing a mixture including chromium trioxide and hydrogen peroxide solution (water); heating the mixture; and cooling the thus heated mixture to room temperature. The mixture preferably includes tellurium or antimony. The mixture including chromium trioxide, hydrogen peroxide solution and tellurium or antimony more preferably includes an alkali compound of LiOH, NaOH, KOH or NH$_4$OH. A preferable temperature range for the heating step is from 200° to 600°C, more preferably 350° to 450°C. Preferable heating time for the heating step is from 1 minute to 5 hours. Preferable atmosphere for the heating step is air, oxygen, nitrogen or an inert gas. In view of easy manufacture, it is more preferable to use air. Preferable pressure for the heating step is 0.01 to 10 atmospheres (kg/cm$^2$).

A chromium trioxide mixed with hydrogen peroxide solution makes a ferromagnetic chromium oxide having saturation magnetization (e.g. 90 e.m.u./g) higher than that of a conventional ferromagnetic chromium oxide made under a low pressure such as atmospheric pressure. Preferable amount of hydrogen peroxide solution added to chromium trioxide depends on its concentration. The higher concentration requires the smaller amount of hydrogen peroxide solution. Preferable amount of H$_2$O$_2$ in hydrogen peroxide solution is more than 0.05% based on the weight of chromium trioxide, however, the added amount of H$_2$O$_2$ of more than 1% is more preferable. When the reaction (heating) is carried out in air, the amount of H$_2$O$_2$ is not critical and can range widely.

For obtaining a ferromagnetic chromium oxide having a high coercive force as well as a high saturation magnetization, a mixture of chromium trioxide, hydrogen peroxide solution and (1) metallic tellurium or any suitable tellurium compound, or (2) metallic antimony or any suitable antimony compound, is prepared and is heat-decomposed according to this invention. Preferable tellurium compounds are $TeO_2$, $TeO_3$, $TeCl_4$, $TeCl_6$, $H_2TeO_4$, $H_2TeO_6$, $Na_2TeO_4$, $Na_2TeO_3$, $K_2TeO_4$, $K_2TeO_3$ and $TeS_2$. Among these compounds, $TeO_2$, $TeO_3$, $H_6TeO_4$ and $H_6TeO_6$ are more preferable. Preferable antimony compounds are $Sb_2O_3$, $Sb_2O_5$, $SbCl_3$, $SbCl_5$, $Sb_2S_3$, $Sb_2(SO_4)_3$ and $SbOCl$. Among these compounds, $Sb_2O_3$, $Sb_2O_5$, $SbCl_3$ and $SbCl_5$ are more preferable. Preferable amount of tellurium (Te) or antimony (Sb) element ranges from 0.01 to 10 weight % based on the weight of chromium trioxide. By adding Te or Sb to a mixture of chromium trioxide and hydrogen peroxide solution, a ferromagnetic chromium oxide having a high coercive force, e.g. 220 Oe, can be obtained.

A ferromagnetic chromium oxide having a higher coercive force, e.g. 350 Oe, is obtainable when the aforesaid Te or Sb added mixture of chromium trioxide and hydrogen peroxide solution has a further additive of an alkali compound included therein. Preferable alkali compounds are $LiOH$, $NaOH$, $KOH$, $NH_4OH$, $Ca(OH)_2$, $Ba(OH)_2$, Among these compounds, $LiOH$, $NaOH$, $KOH$ and $NH_4OH$ are more preferable. Preferable amount of the alkali compound ranges from 0.01 to 15 weight % based on the weight of chromium trioxide.

The heating and cooling rates in the reaction process have an influence upon a coecive force of ferromagnetic chromium oxide obtained. When a mixture of ferromagnetic chromium oxide, hydrogen peroxide solution, a tellurium or antimony element and, if necessary, an alkali compound is heated rapidly with a high heating rate and is then cooled rapidly with a high cooling rate, the resultant ferromagnetic chromium oxide has more acicular shape and higher coercive force with an increment of about 50–100 Oe compared with slow heating and furnace-cooling treatment. Preferable rapid heating is with a heating rate of more than 10°C/min., and preferable rapid cooling is by air-quenching.

In manufacturing, the starting material of chromium trioxide with or without aforesaid additives of tellurium, antimony or alkali material is mixed with a solution of suitable concentration of hydrogen peroxide by any available and suitable conventional mixing technique. The mixture is put into a corrosion-resistent crucible such as alumina, glass, platinum or stainless beaker, and placed in an electric furnace which is provided with a thermocouple for measuring the reaction temperature. The crucible having the mixture therein is heated at a temperature of 200°C to 600°C, preferably 350°C to 450°C, with a suitable heating rate, maintained at the reaction temperature for one minute to 5 hours which time depends on the reaction temperature in air and is then furnace-cooled or air-quenched or cooled in a similar manner to room temperature. After having cooled, the product is washed with distilled water and dried by any available suitable method. The outside of ranges indicated hereinbefore of the reaction temperature, reaction time and the added amount of $H_2O_2$, Te, Sb and alkali compound are likely to contribute to the production of $Cr_2O_5$, $Cr_2O_3$ or both of these, which are non-magnetic oxides, and to a lower coercive force and saturation magnetization.

The coercive force (Hc) is derived from the magnetization versus magnetic field curves which are measured at maximum field of 3000 Oersteds by using conventional method. The saturation magnetization at room temperature and the curie temperature are measured by a magnetic balance which is described in the publication by Hirone et al. (Sci. Rep. RITU 6A, 1954, 67).

The phase of a product is confirmed by a D3-F type X-ray diffractiometer (Rigakudenki Co.) using copper $K\alpha$ radiation.

Such a method for producing ferromagnetic chromium dioxide essentially under atmospheric pressure as of this invention can hardly be conveniently compared with the conventional method since the method of this invention does not require the use of the expensive reaction vessel and apparatus enough to withstand high pressure.

The ferromagnetic chromium dioxide powder thus obtained is suitable for magnetic core or magnetic recording media, especially for tapes and drums in the high density magnetic recording. The following examples are meant to illustrate preferred embodiments of the invention, but not meant to limit all the scope thereof.

EXAMPLE 1

Each of mixtures of one gram of chromium trioxide ($CrO_3$) and 5 milliliters of hydrogen peroxide solution (10% solution) was put into an alumina crucible having an inner volume of 10 milliliters. The crucible having the mixture therein was placed in a tubular electric furnace. The mixture in the crucible was heated at 430°C for one hour with a heating rate of 6°C/min under an atmospheric pressure (about 1kg/cm$^2$) in the presence of atmosphere listed in Table 1 and was furnace-cooled to room temperature. The reaction product was taken out of the crucible and rinsed with distilled water. The product was a black and magnetic powder and was dried at 100°C. The X-ray diffraction analysis described in the foregoing description proved that all resultant products were chromium dioxide in a single phase of rutile type tetragonal crystal structure. Table 1 shows the magnetic properties of the products.

Table 1

| Atmosphere in the heater | Magnetic properties of the products obtained in different atmospheres | | |
|---|---|---|---|
| | $\sigma s$(e.m.u./g)* | Hc(Oe) | Tc(°C) |
| air | 99 | 60 | 116.0 |
| $O_2$ gas | 99 | 70 | 116.0 |
| $N_2$ gas | 98 | 70 | 115.5 |

*Saturation magnetization at room temperature

EXAMPLE 2

A mixture of 10 g of $CrO_3$ and 0.5 milliliter of hydrogen peroxide solution (30% solution) was put into an alumina crucible having an inner volume of 10 milliliters. The crucible having the mixture therein was placed in a tubular electric furnace. The mixture in the crucible was heated at 450°C for 1.5 hours with a heating rate of 6°C/min. in air and was furnace-cooled to room temperature. The subsequent procedure was carried out in the same way as described in Example 1.

The magnetic properties of the resultant product were:

Saturation magnetization at room temperature: $\sigma s=95$ e.m.u./g

Coercive force :Hc=75 Oe
Curie temperature :Tc=116.0°C

EXAMPLE 3

A mixture of 1 g of $CrO_3$ and 50 milliliters of hydrogen peroxide solution (1% solution) was put into an alumina crucible having an inner volume of 60 milliliters. The crucible having the mixture therein was placed in a tubular electric furnace. The mixture in the crucible was heated at 430°C for 1 hour with a heating rate of 6°C/min in air and was furnace-cooled to room temperature. The subsequent procedure was carried out in the same way as described in Example 1.

The magnetic properties of the resultant product were:

Saturation magnetization at room temperature: $\sigma s=96$ e.m.u./g

Coercive force :Hc=80 Oe
Curie temperature :Tc=116.5°C

EXAMPLE 4

A mixture of 2 g of $CrO_3$ and 10 milliliters of hydrogen peroxide solution (10% solution) was put into a platinum crucible having an inner volume of 10 milliliters. The crucible having the mixture therein was placed in a sealed type and tubular electric furnace of stainless steel. The mixture in the crucible was heated at 430°C for 1 hour with a heating rate of 5°C/min. The inner pressure of the electric heater at 430°C was about 5 kg/cm². After heating, the crucible was furnace-cooled to room temperature and the pressure was released. The reaction product was taken out of the crucible and rinsed with distilled water. The product was a black and magnetic powder and was dried at 100°C. The X-ray diffraction analysis proved that the resultant product was chromium dioxide in a single phase of rutile type tetragonal crystal structure.

The magnetic properties of the resultant product were:

Saturation magnetization at room temperature: $\sigma s=98$ e.m.u./g

Coercive force :Hc=80 Oe
Curie temperature :Tc=116.0°C

EXAMPLE 5

Mixtures of 2g or $CrO_3$, 0.06 g of $Sb_2O_3$ and 10 milliliters of hydrogen peroxide solution (10% solution) were heated at the temperatures listed in Table 2 for 1.5 hours with a heating rate of 6°C/min in air and were furnace-cooled to room temperature. The general procedure was carried out in the same way as described in Example 1. The obtained ferromagnetic chromium oxides had magnetic properties listed in Table 2.

Table 2

| Additive (wt %)* | Magnetic properties of the products obtained at each reaction temperature | | | |
|---|---|---|---|---|
| | Reaction Temperature (°C) | σs (e.m.u./g)** | Hc(Oe) | Tc(°C) |
| $Sb_2O_3$ 3% | 350 | 75 | 140 | 116.0 |
| " | 380 | 82 | 180 | 116.0 |
| " | 420 | 93 | 210 | 115.5 |
| " | 450 | 79 | 220 | 116.5 |

*Weight percent based on weight of $CrO_3$
**Saturation magnetization at room temperature

EXAMPLE 6

A mixture of 10g of $CrO_3$, 0.05 g of $TeO_2$ and 1.5 milliliters of hydrogen peroxide solution (10% solution) was heated at 420°C for 1.5 hours with a heating rate of 6°C/min in air and was furnace-cooled to room temperature. The general procedure was carried out in the same way as described in Example 1.

The magnetic properties of the resultant product were:

Saturation magnetization at room temperature: $\sigma s=93$ e.m.u./g

Coercive force :Hc=160 Oe
Curie Temperature :Tc=115.5°C

EXAMPLE 7

A mixture of 2 g of $CrO_3$, 0.06 g of $Sb_2O_3$ and 10 milliliters of hydrogen peroxide solution (10 % solution) was put into an alumina crucible having an inner volume of 10 milliliters. The crucible having the mixture therein was placed in a tubular electric furnace. The mixture in the crucible was heated at 420°C for 10 minutes with a heating rate of 21°C/min in air and was air-quenched to room temperature from the electric furnace. The product was rinsed with distilled water and dried at 100°C.

The magnetic properties of the resultant product were:

Saturation magnetization at room temperature: $\sigma s=77$ e.m.u./g

Coercive force :Hc=270 Oe
Curie temperature :Tc=116.0°C

EXAMPLE 8

A mixture fo 1 g of $CrO_3$, 0.03 g of $TeO_2$ and 10 milliliters of hydrogen peroxide solution (10 % solution) was heated at 420°C for 5 minutes with a heating rate of 21°C/min and was air-quenched at room temperature. The general procedure was carried out in the same way as described in Example 7.

The magnetic properties of the resultant product were:

Saturation magnetization at room temperature: $\sigma s=75$ e.m.u./g

Coercive force :Hc=230 Oe
Curie Temperature :Tc=115.5°C

EXAMPLE 9

Mixtures of 2 g of $CrO_3$, 0.06 g of $TeO_2$, 0.06 g of alkali compound selected from LiOH, KOH and $NH_4OH$ and 5 milliliters of hydrogen peroxide solution (10% solution) were heated at 400°C for 1 hour with a heating rate of 6°C/min in air and were furnace-cooled to room temperature. The general procedure was carried out in the same way as described in Example 1. The obtained ferromagnetic chromium oxides had magnetic properties listed in Table 3.

Table 3

| Magnetic properties of the products obtained with a combined addition of $TeO_2$ and alkali compound of LiOH, NaOH, KOH or $NH_4OH$. | | | | |
|---|---|---|---|---|
| Additives (wt %)* | | $\sigma s$ (e.m.u./g)** | Hc(Oe) | Tc(°C) |
| $TeO_2$ | 3% | | | |
| NaOH | 3% | 93 | 240 | 116.0 |
| $TeO_2$ | 3% | | | |
| KOH | 3% | 91 | 230 | 116.0 |
| $TeO_2$ | 3% | | | |
| LiOH | 3% | 92 | 250 | 116.0 |
| $TeO_2$ | 3% | | | |
| $NH_4OH$ | 3% | 90 | 230 | 116.0 |

*Weight percent based on weight of $CrO_3$
**Saturation magnetization at room temperature

EXAMPLE 10

Mixtures of 2 g of $CrO_3$, 0.06 g of $H_6TeO_6$, 0.0002 g to 0.3 g of LiOH and 5 milliliters of hydrogen peroxide solution (30 % solution) were heated at 400°C for one hour with a heating rate of 6°C/min in air and were furnace-cooled to room temperature. The general procedure was carried out in the same way as described in Example 1. The obtained ferromagnetic chromium oxides had magnetic properties listed in Table 4.

Table 4

| Magnetic properties of the products obtained with a combined addition of $H_6TeO_6$ and LiOH | | | |
|---|---|---|---|
| Additives (wt %)* | $\sigma s$ (e.m.u./g)** | Hc(Oe) | Tc(°C) |
| $H_6TeO_6$ 3% LiOH 0.01% | 95 | 180 | 115.0 |
| 3% 0.1% | 94 | 200 | 115.0 |
| 3% 1% | 94 | 240 | 116.0 |
| 3% 5% | 90 | 260 | 116.0 |
| 3% 10% | 88 | 300 | 115.0 |
| 3% 15% | 82 | 320 | 115.0 |

*Weight percent based on weight of $CrO_3$
**Saturation magnetization at room temperature

EXAMPLE 11

Mixtures of 2 g of $CrO_3$, 0.06 g of $Sb_2O_3$, 0.06 g of alkali compound of LiOH, NaOH, KOH or $NH_4OH$ and 5 milliliters of hydrogen peroxide solution (10% solution) were heated at 400°C for 1 hour with a heating rate of 6°C/min in air and were furnace-cooled to room temperature. The general procedure was carried out in the same way as described in Example 1. The obtained ferromagnetic chromium oxides had magnetic properties listed in Table 5.

Table 5

| Magnetic properties of the products obtained with a combined addition of antimony trioxide and alkali compound of LiOH, NaOH, KOH or $NH_4OH$ | | | | |
|---|---|---|---|---|
| Additives (wt %)* | | $\sigma s$ (e.m.u./g)** | Hc(Oe) | Tc(°C) |
| $Sb_2O_3$ 3% | NaOH 3% | 92 | 240 | 116.0 |
| $Sb_2O_3$ 3% | KOH 3% | 93 | 260 | 115.0 |
| $Sb_2O_3$ 3% | LiOH 3% | 93 | 300 | 116.0 |
| $Sb_2O_3$ 3% | $NH_4OH$ 3% | 92 | 250 | 116.0 |

*Weight percent based on weight of $CrO_3$
**Saturation magnetization at room temperature

EXAMPLE 12

Mixtures of 2 g of $CrO_3$, 0.06 g of $Sb_2O_3$, 0.0002 g to 0.3 g of LiOH and 6 milliliters of hydrogen peroxide solusion (30% solution) were heated at 420°C for 5 minutes with a heating rate of 30°C/min in air and were air-quenched to room temperature. The general procedure was carried out in the same way as described in Example 7. The obtained ferromagnetic chromium oxide had magnetic properties listed in Table 6.

Table 6

| Magnetic properties of products obtained with a combined additions of $Sb_2O_3$ and LiOH | | | | |
|---|---|---|---|---|
| Additives (wt %)* | | $\sigma s$ (e.m.u./g)** | Hc(Oe) | Tc(°C) |
| $Sb_2O_3$ 3% | LiOH 0.01% | 76 | 290 | 116.0 |
| 3% | 0.1% | 78 | 300 | 116.0 |
| 3% | 1 % | 79 | 340 | 115.5 |
| 3% | 3 % | 78 | 360 | 115.0 |
| 3% | 5 % | 82 | 390 | 115.5 |
| 3% | 10 % | 80 | 400 | 115.0 |
| 3% | 15 % | 78 | 380 | 115.0 |

*Weight percent based on weight of $CrO_3$
**Saturation magnetization at room temperature

EXAMPLE 13

A mixture of 2 g of $CrO_3$, 0.06 g of $TeO_2$, 0.2 g of alkali compound selected from LiOH, NaOh, KOH and $NH_4OH$ and 10 milliliters of hydrogen peroxide solution (10% solution) were heated at 420°C for 10 minutes with a heating rate of 30°C/min in air and were air-quenched to room temperature. The general procedure was carried out in the same way as described in Example 7. The obtained ferromagnetic chromium oxide had magnetic properties listed in Table 7.

Table 7

| Magnetic properties of the products obtained with a combined addition of $TeO_2$ and alkali compound of LiOH, NaOH, KOH or $NH_4OH$ | | | | |
|---|---|---|---|---|
| Additives (wt %)* | | $\sigma s$ (e.m.u./g)** | Hc(Oe) | Tc(°C) |
| $TeO_2$ 3% | NaOH 10% | 79 | 300 | 116.0 |
| $TeO_2$ 3% | KOH 10% | 81 | 290 | 115.5 |
| $TeO_2$ 3% | LiOH 10% | 81 | 330 | 115.5 |
| $TeO_2$ 3% | $NH_4OH$ 10% | 80 | 280 | 116.0 |

*Weight percent based on weight of $CrO_3$
**Saturation magnetization at room temperature

What is claimed is:

1. A method for producing a ferromagnetic chromium dioxide, comprising: preparing a mixture including chromium trioxide and a hydrogen peroxide solution including $H_2O_2$ of more than 0.05 weight percent based on the weight of said chromium trioxide; heating said mixture in an air atmosphere at a pressure of 0.01 to 10 atmospheres and a temperature of 200° to 600°C for 1 minute to 5 hours; and cooling the thus heated mixture to room temperature.

2. A method according to claim 1, wherein said mixture includes tellurium in an amount of 0.01 to 10 weight % based on the weight of said chromium trioxide.

3. A method according to claim 2, wherein said heating is carried out with a heating rate higher than 10°C/min., and said cooling is carried out by air-quenching.

4. A method according to claim 2, wherein said mixture includes an alkali compound selected from the group consisting of LiOH, NaOH, KOH and NH$_4$OH in an amount of 0.01 to 15 weight % based on the weight of said chromium trioxide.

5. A method according to claim 4, wherein said heating is carried out with a heating rate higher than 10°C/min., and said cooling is carried out by air-quenching.

6. A method according to claim 1, wherein said mixture includes antimony in an amount of 0.01 to 10 weight % based on the weight of said chromium trioxide.

7. A method according to claim 6, wherein said heating is carried out with a heating rate higher than 10°C/min., and said cooling is carried out by air-quenching.

8. A method according to claim 6, wherein said mixture includes an alkali compound selected from the group consisting of LiOH, NaOH, KOH and NH$_4$OH in an amount of 0.01 to 15 weight % based on the weight of said chromium trioxide.

9. A method according to claim 8, wherein said heating is carried out with a heating rate more than 10°C/min., and said cooling is carried out by air-quenching.

10. A method according to claim 1, wherein the amount of said H$_2$O$_2$ in said hydrogen peroxide solution is more than 1 weight % based on the weight of said chromium trioxide, and said heating is from 350° to 450°C.

11. A method according to claim 10, wherein said mixture includes tellurium in an amount of 0.01 to 10 weight % based on the weight of said chromium trioxide.

12. A method according to claim 11, wherein said heating is carried out with a heating rate higher than 10°C/min., and said cooling is carried out by air-quenching.

13. A method according to claim 11, wherein said mixture includes an alkali compound selected from the group consisting of LiOH, NaOH, KOH and NH$_4$OH in an amount of 0.01 to 15 weight % based on the weight of said chromium trioxide.

14. A method according to claim 13, wherein said heating is carried out with a heating rate higher than 10°C/min., and cooling is carried out by air-quenching.

15. A method according to claim 10, wherein said mixture includes antimony in an amount of 0.01 to 10 weight % based on the weight of said chromium trioxide.

16. A method according to claim 15, wherein said heating is carried out with a heating rate higher than 10°C/min., and said cooling is carried out by air-quenching.

17. A method according to claim 15, wherein said mixture includes an alkali compound selected from the group consisting of LiOH, NaOH, KOH and NH$_4$OH in an amount of 0.01 to 15 weight % based on the weight of said chromium trioxide.

18. A method according to claim 17, wherein said heating is carried out with a heating rate higher than 10°C/min., and said cooling is carried out by air-quenching.

* * * * *